Patented Aug. 26, 1924.

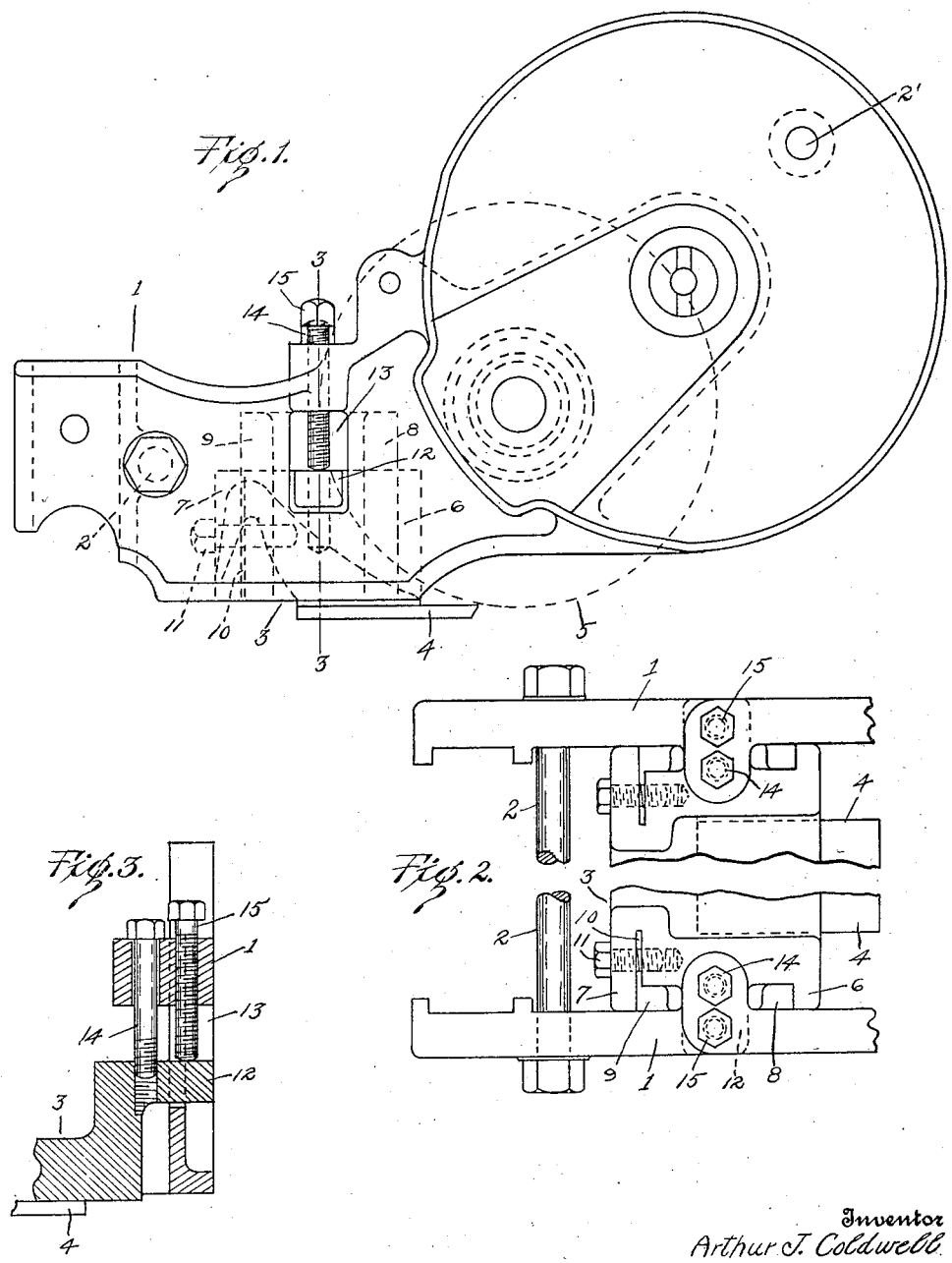

1,506,163

UNITED STATES PATENT OFFICE.

ARTHUR J. COLDWELL, OF LANSING, MICHIGAN, ASSIGNOR TO IDEAL ENGINE COMPANY, OF LANSING, MICHIGAN, A CORPORATION OF MICHIGAN.

LAWN MOWER.

Application filed October 22, 1921. Serial No. 509,699.

*To all whom it may concern:*

Be it known that I, ARTHUR J. COLDWELL, a citizen of the United States of America, residing at Lansing, in the county of Ingham and State of Michigan, have invented certain new and useful Improvements in Lawn Mowers, of which the following is a specification, reference being had therein to the accompanying drawings.

The invention relates to lawn mowers and has for its object the provision of means for adjusting the cutter bar relative to the knife reel without in the least distorting the frame of the lawn mower. Other objects of my invention reside in the novel features of construction as more fully hereinafter set forth.

In the drawings:

Figure 1 is a side elevation of a portion of a lawn mower embodying my invention;

Figure 2 is a top plan view thereof;

Figure 3 is a cross section on the line 3—3 of Figure 1.

1 are the sides of the lawn mower frame rigidly connected by the front and rear cross rods 2 and 2' respectively which form a rigid rectangular frame. 3 is the cutter bar having the cutter plate 4 which is adapted to be positioned in proximity to the path of travel 5 of the cutting edges of the knife reel, which latter is journalled in the frame sides.

The cutter bar 3 extends between the frame sides 1 and has at its ends the front and rear vertical projections 6 and 7 respectively which engage the front and rear faces of the front and rear vertical guides 8 and 9 upon the frame sides. To prevent lateral play between the cutter bar and the guides, the ends of the cutter bar are longitudinally slit at 10 with the rear sides of the slots in substantial alignment with the front faces of the rear projections 7 and suitable means such as cap bolts 11 are provided extending through the rear projections and threadedly engaging the body of the cutter bar for tightening the rear projections upon the rear guides. The cutter bar has at its opposite ends the tongues 12 which extend into and slidably engage the vertically elongated openings 13 in the frame sides 1.

For adjusting the cutter bar so that its cutter plate will assume the desired position relative to the path of rotation of the cutting edges of the knife reel, there are the cap bolts 14 freely engaging in the frame sides 1 and threadedly engaging in the tongues 12. Rotation of either cap bolts 14 will raise or permit of lowering the corresponding end of the cutter bar and to hold the ends of the cutter bar in their positions of adjustment, there are the cap bolts 15 adjacent to the cap bolts 14 and threadedly engaging the frame sides and abutting at their lower ends the tongues 12.

From the above description, it will be readily seen that I have provided a construction for adjusting the cutter bar relative to the knife reel without distortion of the lawn mower frame since the cutter bar is raised and lowered in the frame instead of being mounted for relative rocking movement. Also, with my construction, the cutter bar is guided in its movements and held parallel in all cases to its original plane.

What I claim as my invention is:

1. In a lawn mower, the combination with a frame having sides, said sides having vertically elongated openings therein, of a cutter bar extending between said frame sides and provided with tongues at its opposite ends engaging in said openings, guides upon said frame sides adapted for sliding engagement by the ends of said cutter bar, means upon said frame sides and engaging said tongues for adjustably raising the ends of said cutter bar, and adjustable stops upon said frame sides engageable with said tongues for holding the ends of said cutter bar in their adjusted positions.

2. In a lawn mower, the combination with a frame having sides, said sides having openings therein, of a cutter-bar between said sides, tongues extending laterally from said cutter-bar and movable in the openings in said frame sides, guides carried by said frame sides, projections upon said cutter-bar engageable with said guides, means carried by said frame sides and engaging said tongues for raising or lowering said cutter bar, and means for preventing lateral play between said cutter-bar and said guides.

3. In a lawn mower, the combination with a frame having sides, said sides having openings therein, of a cutter-bar between said sides, tongues extending from said cutter-bar and movable in the openings in said frame sides, vertical guides carried by said frame sides, projections upon said cutter-bar engageable with said guides, means carried by said frame sides and engaging said tongues for raising or lowering said cutter-bar, and adjustable means for preventing lateral play between said cutter-bar and said guides.

4. In a lawn mower, the combination with a frame and a cutter bar, of a projection on the cutter bar, a guide carried by the frame engageable with the projection, and means for adjusting the projection relative to the guide to prevent lateral play between the cutter bar and frame.

5. In a lawn mower, the combination with a frame, of a cutter bar disposed between the sides of said frame and having spaced lateral projections, guides carried by said frame between said projections, and means for adjusting certain of said projections with respect to certain of said guides to prevent lateral play between the cutter bar and frame.

6. In a lawn mower, the combination with a frame, of a cutter bar disposed between the sides of said frame and having spaced lateral projections, guides carried by said frame between said projections, said cutter bar being slit with one wall of the slot in substantial alignment with one face of one projection, and means for tightening the last-mentioned projection upon one of the guides to prevent lateral play between the cutter bar and frame.

7. In a lawn mower, the combination with a frame, of a cutter bar disposed between the sides of said frame and having spaced lateral projections, said cutter bar being slit with one wall of the slot in substantial alignment with one face of one projection, and a headed element extending through the last-mentioned projection and threadedly engaging the cutter and tightening the said last-mentioned projection upon one of the guides.

8. In a lawn mower, the combination with a frame having sides, said sides having openings therein, of a cutter bar between said sides, a tongue extending laterally from said cutter bar and movable in the openings in said frame sides, guides carried by said frame sides, projections upon said cutter bar engageable with said guides, adjustable headed elements carried by said frame sides and engaging said tongues for raising or lowering said cutter bar, and means for preventing lateral play between said cutter bar and said guides.

In testimony whereof I affix my signature.

ARTHUR J. COLDWELL.